Dec. 2, 1952  R. V. FORD  2,619,837
METER BOX AND METER MOUNTING
Filed March 16, 1951  2 SHEETS—SHEET 1
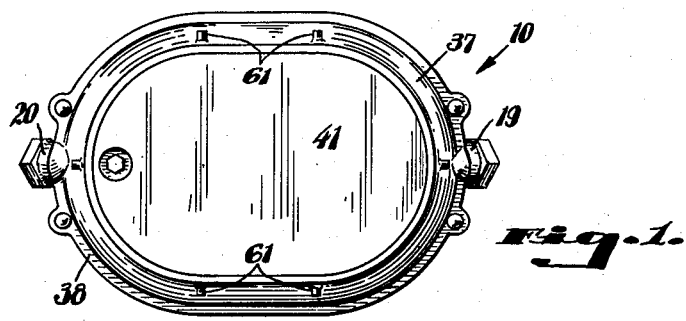
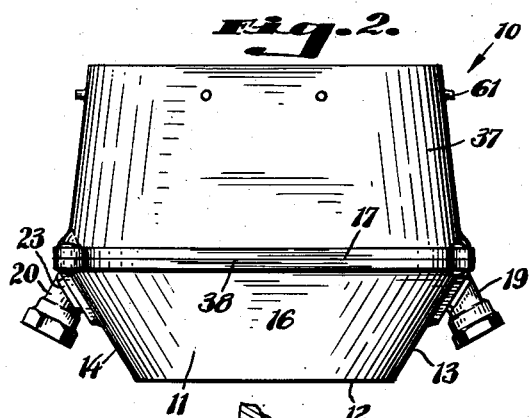
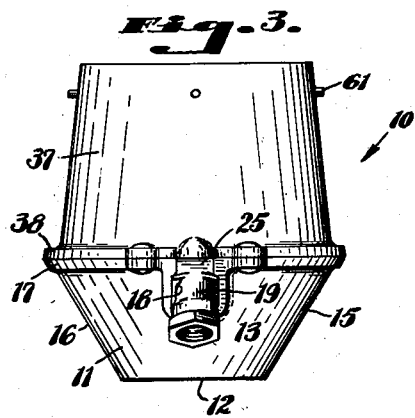
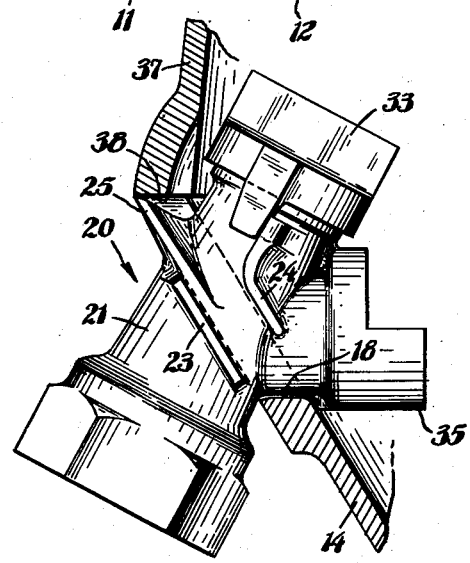
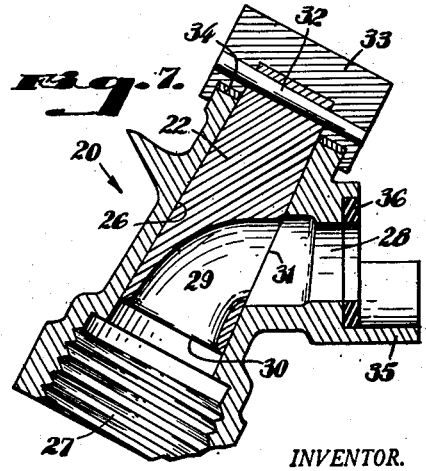
INVENTOR.
RICHARD V. FORD,
BY: Harold B. Wood.
ATTORNEY.

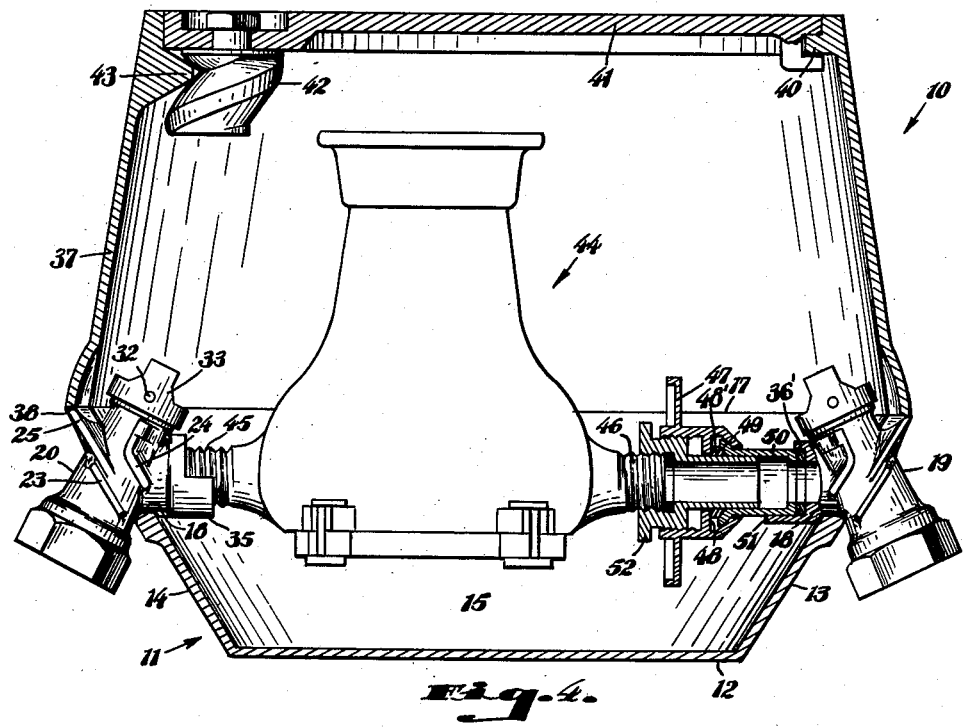
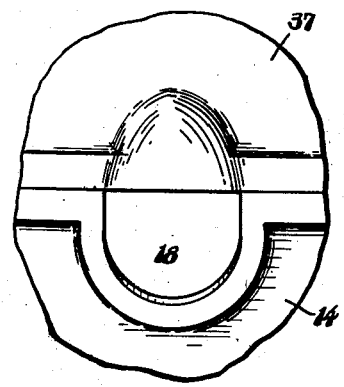
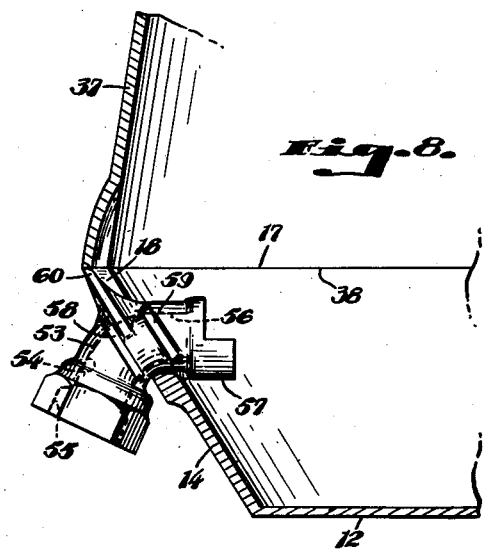
INVENTOR.
RICHARD V. FORD,
BY:
Harold B. Wood
ATTORNEY.

Patented Dec. 2, 1952

2,619,837

UNITED STATES PATENT OFFICE 2,619,837

METER BOX AND METER MOUNTING

Richard V. Ford, Haddonfield, N. J., assignor to The Ford Meter Box Company, Inc., Wabash, Ind., a corporation of Indiana Application March 16, 1951, Serial No. 215,900

7 Claims. (Cl. 73—201)

The present invention relates to a meter box and meter mounting, and is primarily concerned with the provision of a novel structure for housing and supporting a water meter or similar instrument. The primary object of the invention is to improve and modify structure heretofore known for accomplishing similar purposes, thereby reducing the cost and bulk of the equipment and reducing hazards resulting from the use of conventional structures, while retaining all of the advantages of known equipment and improving upon some of them.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a top plan view of a meter box constructed in accordance with the present invention;

Fig. 2 is a side elevation thereof;

Fig. 3 is an end elevation thereof;

Fig. 4 is a longitudinal section therethrough, drawn to an enlarged scale and showing a meter housed and supported therein;

Fig. 5 is an enlarged fragmentary end elevation showing a detail;

Fig. 6 is a further enlarged side elevation of a valved fitting comprising a feature of my invention showing fragments of the box with which it is associated;

Fig. 7 is a longitudinal section through the fitting of Fig. 6; and

Fig. 8 is a fragmentary sectional view, drawn substantially to the scale of Fig. 4, and showing a modified form of fitting associated with the box.

Referring more particularly to the drawings, it will be seen that I have illustrated a meter box novel in form primarily in that it is obround in horizontal contour and in that it tapers from an intermediate level in its height, toward its top and toward its bottom. This peculiar configuration is adopted primarily in order to conserve the material from which the box is formed, to reduce to a minimum the amount of excavation required for sinking the box below ground level, and to provide a snug, yet amply capacious, enclosure for a meter or similar instrument. The invention finds its primary utility as an enclosure and mounting for water meters, and it has been illustrated, and will be described in that environment, though the inventive features thereof may be adapted to other applications.

As shown, the box is formed in two major pieces, each preferably a ferrous metal casting. A bottom section or tray, indicated generally by the reference numeral 11, comprises a bottom wall 12 of obround contour surrounded by rising and flaring opposite end walls 13 and 14 and opposite side walls 15 and 16. The flaring walls surrounding the bottom 12 terminate preferably in a continuous rim 17 disposed in a plane parallel to the plane of the flat bottom 12.

At each end of the tray, the inclined, upstanding wall is formed with a slot 18 opening through the rim 17; and a fitting 19 is received in one of said slots, while a fitting 20 is received in the other of said slots. The two fittings shown in Fig. 4 are identical, and therefore only one will be described in detail. They are, of course, arranged in allochiral relation.

The fitting 20 comprises a valve casing 21 in which is received a rotary plug 22, though it will be clear that a properly constructed compression or other type valve might be substituted therefor. Externally, the casing is formed, at each of two opposite locations, with a lip 23 and a substantially parallel lip 24 adapted to receive therebetween a side wall of the slot 18 as the fitting 20 is inserted into said slot, whereby said fitting is held reasonably solidly in its slot, in the attitude illustrated in Figs. 4 and 6. Preferably, a fin 25 integrally projects from the casing 21 into the plane of the rim 17 to close that portion of the slot above the flanges 23.

Interiorly, the casing 21 is formed to provide a conical bore 26 in which is seated the correspondingly conical plug 22. The socket 26 is intersected by, and constitutes a portion of, a flow passage through the casing 21, said passage having one end 27 disposed upon an axis coincident with the axis of the bore 26 and having its opposite end 28 disposed upon an axis obtusely angularly related to the first-named axis. The casing 21 is so mounted in the slot 18 as to be held in an attitude in which the axis of the passage end 27 inclines downwardly and away from the meter box, while the axis of the end 28 of said passage is disposed in a substantially horizontal plane. The first-named end portion of the passage, and a substantial portion of the casing 21, will be located outside the box, as is clearly illustrated in the drawings; while the end 28 of the passage is located inside the meter box.

The plug 22 is formed with a curved passage 29 therethrough, one end 30 of said passage 29 being coaxial with the end 27 of the passage through the casing, and the opposite end 31 of the passage 29 opening through the periphery of the plug upon an axis coincident with the axis of the passage end 28.

As shown, the smaller end of the plug 22 projects beyond the housing 21 and is formed with a transaxial bore in which is received a pin 32 securing a cap or manipulating head 33 in place upon said plug.

The casing 21 is further formed with a lip or saddle 35, coaxial with the end 28 of the passage through the casing, and the casing is preferably formed for reception of a gasket 36 at the inner end of said saddle. The saddle is substantially semi-cylindrical and opens upwardly for a purpose later to become apparent.

The upper section 37 of the box 10 is open at both ends, terminating, at its lower edge, in a rim 38 adapted for mating coincidence with the rim 17 of the tray 11; and suitable means will be provided for securing the two sections 11 and 37 together at their meeting rims. When so secured in place, the rim 38 engages the fins 25 of the fittings 19 and 20 to hold said fittings solidly in their seats. Adjacent its upper end, the section 37 may be formed with continuous or interrupted ledge 40 upon which may be supported a cover or closure plate 41. Any desired means, such as the conventional camming lock screw 42, may be supported upon the cover plate 41 for engagement with a lug 43 or the like upon the section 37 to secure the cover plate 41 in place thereon.

The box is adapted to support and house a meter or the like, such as that indicated generally by the reference numeral 44 in Fig. 4. One spud 45 of a conventional meter may be received and supported in the saddle 35 of the fitting 20. The opposite spud 46 may, as shown, carry an expanding connector which, as shown, comprises a hand wheel element 47 threadedly adjustably mounted on a barrel 52 which, in turn, is threadedly tightened against the end of said spud 46. Said element 47 affords an annular shoulder 48 engaging a washer 48' bearing against a flared flange 49 of a thimble piece 50 to press said thimble piece against a washer 36' received in the saddle 51 of the fitting 19 corresponding to the saddle 35 of the fitting 20.

The opening through the upper end of the box section 37 is proportioned and designed barely to pass the meter with its associated connector. When the spud 45 and the thimble piece 50 have been rested upon the saddles 35 and 51, respectively, the hand wheel 47 is rotated to elongate the effective distance between the oppositely-facing ends of the spud 45 and the thimble piece 50. Ultimately, those ends will be sealingly pressed against the gaskets 36 and 36' to establish a leakproof passage, through the meter, from the fitting 19 to the fitting 20.

It will be seen that, since the fittings 19 and 20 are mounted in the walls 13 and 14 in the manner above described, the axes of their respective plugs 22 are inclined upwardly and toward each other. The parts are so proportioned and designed that a continuation of each such axis will pass through the open upper end of the section 37, and will not intersect any element of the meter 44. As a consequence, though the major dimension of the open end of the section 37 is less than the distance between the upper ends of the valve plugs of the fittings 19 and 20, nevertheless a straight shanked tool may be entered through that open end of the section 37 to engage and operate either of said valve plugs.

In some installations, only one of the fittings associated with a box need be valved, in which case the other fitting may be a simple unvalved elbow such as that indicated at 53 in Fig. 8. The fitting 53, of course, will be formed with a passage 54 therethrough, one end 55 of which will be located outside the box and upon an axis inclined downwardly and away from the box, and the other end 56 thereof will be located inside the box and upon a horizontal axis. A saddle 57 equivalent to the saddle 35 will be incorporated in the fitting 53; and exteriorly, said fitting will be provided with flanges 58 and 59 and with a fin 60, functionally equivalent, respectively, to the elements 23, 24 and 25 of the fitting 20. When in position, as shown in Fig. 8, the terminus 56 of the passage 54 through the fitting 53 will be axially aligned with the terminus 28 of the passage through a fitting, such as the fitting 19, mounted at the opposite end of the box.

By the particular proportioning and designing of the cooperating elements of the meter box and mounting disclosed herein, I provide ample room for mounting or removing a meter, while minimizing the total volume of the box. Thereby, I have saved substantial proportions of the material required to construct boxes of the types heretofore known, yet I have sacrificed no functional advantage of such previously-known boxes. Additionally, I have very materially reduced the size of the open, upper end of the box, thereby minimizing the hazard to pedestrians created when such an opening is left uncovered. Conventionally, covers for meter boxes are cast from more expensive metals such as brass, bronze, and the like; and because of the particular construction of the box disclosed herein, I have substantially reduced the area of, and therefore the amount of metal which must be used in, such a cover.

By reason of the particular construction of the valved fittings 19 and 20 disclosed herein, I am enabled to locate the manipulable elements of said valves safely inside the box, where they are protected against tampering, and yet I have disposed a substantial portion of each of said fittings, not subject to tampering, outside the box, thereby saving the space which otherwise would be required, according to conventional practice, to enclose the entire body of such a fitting. Through the peculiar obtuse-angular relation between opposite ends of the passage through the fitting, I retain most of the advantages of angle cock construction, avoid the disadvantages of straight-through, rotary-plug valve construction, and yet adapt the fittings readily for installation in connection with either conventional galvanized pipe systems or copper tubing systems. Sharp, short-radius 90° bends in copper tubing are difficult to execute satisfactorily in the field; while the obtuse bends necessary to bring horizontal runs of copper tubing into registry with the fittings 10 and 20 may be very simply made on the job.

I claim as my invention:

1. A meter box for mounting and housing a meter or the like, comprising a bottom section and a top section, said sections being formed with mating mouths adapted to register in a common plane and to be joined, each of said sections tapering as it recedes from its mouth, the upper end of said upper section being open, a removable cover for said open upper end of said top section, and two meter-supporting fittings carried, respectively, by opposite walls of said bottom section and penetrating said walls, each such fitting having a flow passage therethrough, the terminus of each fitting passage located inside said box section being disposed on a substantially horizontal line and aligned with the corresponding terminus of the passage of the other fitting, and the termini of said passages located outside said box section inclining downwardly and away from each other, one of said fittings being a valve including a rotary plug having an obtuse-angle passage therethrough, one end of said plug passage opening through an end of said plug and registering, at all times, with the last-named terminus of its fitting passage, and the other end of said plug passage opening through the periphery of said plug and registering, at times, with the first-named terminus of its fitting passage.

2. The meter box of claim 1 in which said plug is a tapered plug whose passage opens through its larger end, the smaller end of said plug being formed for turning engagement by a key and the axis of said plug being inclined upwardly and toward the center of said open upper end of said top section, and a continuation of said axis passing through said open upper end.

3. In a device of the class described, a tray having a substantially flat bottom of greater length than width, and surrounding walls flaring upwardly and outwardly from said bottom to terminate in a rim located in a plane substantially parallel with said bottom, said surrounding walls being provided, at points spaced a maximum distance apart in said plane, with slots opening through said rim, and a fitting entered and seated in each such slot, each fitting having a flow passage formed therethrough, one terminus of the passage through each fitting being located outside said tray upon an axis inclining away from said tray and toward the plane of said bottom, and the other terminus of each such passage being located inside said tray upon an axis parallel with the plane of said bottom and coincident with the axis of the corresponding terminus of the passage through the other fitting, one of said fittings being a valve including a casing and a tapered rotary plug mounted therein, said plug being formed with a bore curved upon an obtuse angle, one end of said bore opening through the larger end of said plug and registering always with the first-named terminus of said passage and the other end of said bore opening through the periphery of said plug and registering, at times, with the last-named terminus of said passage, said plug being mounted for oscillation about an axis coincident with the axis of said first-named passage terminus and said plug projecting above the axis of said last-named passage terminus.

4. A meter box for housing and mounting a meter or the like, comprising a bottom wall, end and side walls flaring upwardly and outwardly from said bottom wall to a predetermined level above said bottom wall and then tapering upwardly and inwardly to define an open mouth dimensioned to pass a meter or the like to be housed in said box, two fittings penetrating the end walls of said box within the flaring region thereof, each of said fittings being formed to provide a passage therethrough, one terminus of each passage being located outside said box and inclining downwardly and away from said box and the other terminus of each passage being located inside said box and extending toward the corresponding terminus of the passage of the other of said fittings and aligned therewith, and means supported from said fittings for supporting a meter therebetween with its spuds in communication with said last-named termini of said passages, respectively, one of said fittings being a valve including a rotary plug mounted for oscillation about an axis coincident with the axis of the first-named terminus of the passage through said one fitting.

5. The meter box of claim 4 in which an extension of said axis about which said plug oscillates passes through the open mouth of said box.

6. A meter box for mounting and housing a meter or the like, comprising a bottom section and a top section, said sections being formed with mating mouths adapted to register in a common plane and to be joined, each of said sections tapering as it recedes from its mouth, the upper end of said upper section being open, a removable cover for said open upper end of said top section, and two meter-supporting fittings carried, respectively, by opposite walls of said bottom section and penetrating said walls, each such fitting having a flow passage therethrough, the terminus of each fitting passage located inside said box section being disposed on a substantially horizontal line and aligned with the corresponding terminus of the passage of the other fitting, and the termini of said passages located outside said box section inclining downwardly and away from each other, one of said fittings comprising a valve casing and a valve member mounted in said casing to turn upon an axis coincident with the axis of the last-mentioned terminus of its fitting passage, and a manipulating head for said valve member located inside said meter box and rotatable about said axis to manipulate said valve member.

7. The meter box of claim 6 in which an imaginary extension of the turning axis of said valve member passes through said open upper end of said meter box upper section.

RICHARD V. FORD.

REFERENCES CITED

The following references are of record in the file of this patent:

UNITED STATES PATENTS

| Number | Name | Date |
|---|---|---|
| 974,651 | Ford | Nov. 1, 1910 |
| 983,311 | McCreedy et al. | Feb. 7, 1911 |
| 1,107,532 | Lofton | Aug. 18, 1914 |
| 1,249,435 | Lofton | Dec. 11, 1917 |
| 1,495,011 | Ford | May 20, 1924 |